Feb. 9, 1960  A. LANDEAU  2,924,145
APPARATUS FOR ANAMORPHOTICAL KINEMATOGRAPHIC
PROJECTION AND VIEW-TAKING

Filed Dec. 15, 1954  2 Sheets-Sheet 1

INVENTOR
ADOLPHE LANDEAU
BY
Mead, Browne, Schuyler & Beveridge
ATTORNEYS

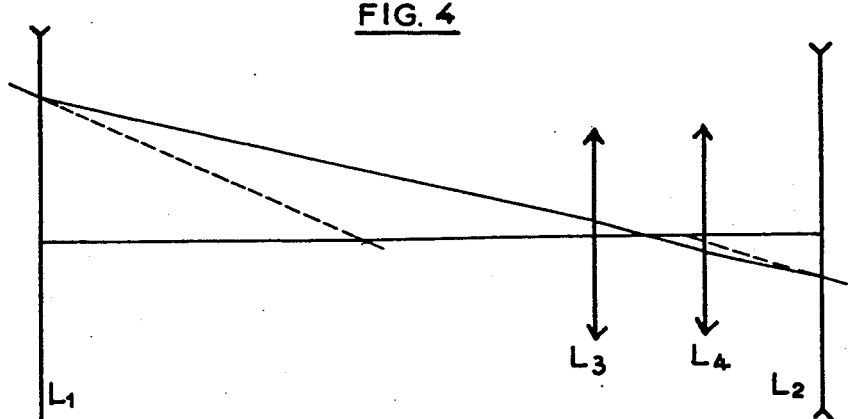
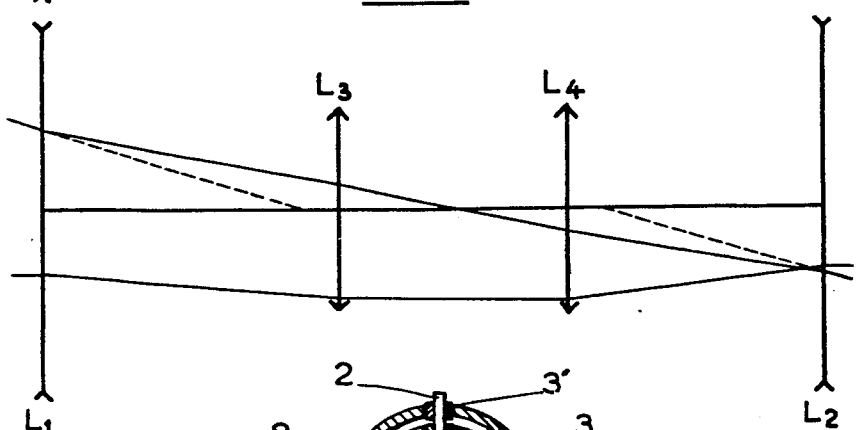
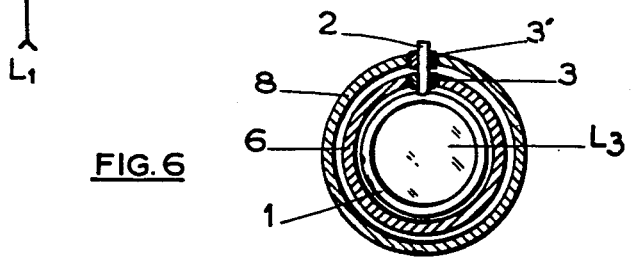
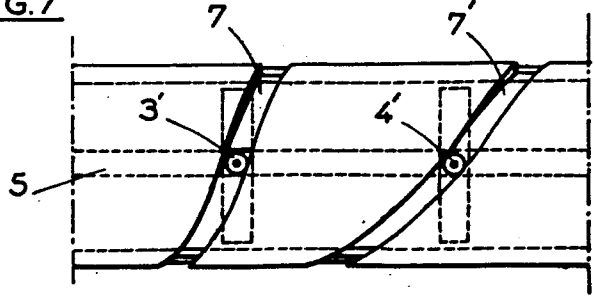

United States Patent Office 2,924,145
Patented Feb. 9, 1960

2,924,145

APPARATUS FOR ANAMORPHOTICAL KINEMATOGRAPHIC PROJECTION AND VIEW-TAKING

Adolphe Landeau, Saint-Cloud, France, assignor to Societe d'Application Technique et d'Exploitation Cinematographique (Satec), Saint-Cloud, France, a corporation of France Application December 15, 1954, Serial No. 475,552

Claims priority, application France December 16, 1953

3 Claims. (Cl. 88—57)

Panoramic kinematographic systems are well-known wherein the pictures, instead of being projected through the conventional angle, are taken and projected through a wide angle which is twice or three times broader and may reach 50°. This arrangement provides the audience with considerable advantages inasmuch as it allows reconstituting in a much more true-to-life manner the scenes to be reproduced and in particular spectacular plays.

Such panoramic projections show however the drawback that in the case of near scenes, close-ups, intimate scenes etc. the pictures continue being projected on a much too considerable breadth, which is objectionable and contrary to the desired results to be sought for, whereas, generally speaking, kinematographic producers have a tendency to imagine scenes only breadthwise.

My invention has for its object to cut out this drawback and to this end it consists firstly in providing at the moment of the taking or projection of the same pictures a gradual transition between projection on an ordinary screen and projection on a broad screen and reversely, the breadth of projection being selected in accordance with the nature of each scene. It has already been proposed to obtain this result by using both for view taking and for projection an anamorphotic objective of which the field is framed both when view taking and when projecting so as to adjust the size of field in both cases in accordance with the desired breadth of view taking or of projection and said breadth may in fact be modified gradually in accordance with requirements through framing means the operation of which is adjusted so as to assume again at the moment of the projection the location occupied during the view taking. This arrangement leads however to the drawback of using only the central section of the objective during the view-taking and during the projection of the pictures on a standard screen.

An improved arrangement provided by my invention consists in resorting to an anamorphotic optic system the breadth of the field of which varies as desired within predetermined limits in accordance with requirements.

Such an arrangement may in particular be constituted by the combination of the view-taking or projecting objective of a standard type with an anamorphotic afocal optic system to be located in front of the said usual objective; said afocal system includes preferably on one hand two cylindrical lenses, whether simple or compound, having a vertical axis and adapted to produce the desired horizontal anamorphosis, said cylindrical lenses having both a fixed predetermined position with reference to the objective, and on the other hand a movable set constituted by two or more further lenses which are also cylindrical and the axes of which are also vertical; these last mentioned lenses are adapted to move with reference to each other and with reference to the first mentioned stationary cylindrical lenses in a manner such that the afocal system formed which in no case modifies the vertical size of the projected picture produces horizontally for each location of the movable lenses the desired magnification which varies within predetermined limits under the action of the shifting of the movable intermediate lenses. This last mentioned shifting may be obtained in any well-known manner by means of mechanisms including a helical control providing for the correct movement of the intermediate lenses with reference to each other and with reference to the remainder of the optic system.

It is obviously important for the movement of the intermediate lenses during the view-taking procedure to be repeated with sufficient accuracy at the moment of the projection. This result may be achieved by recording on the actual film, through a suitable arrangement of any type, the movement to which the movable lenses are submitted; said recording serves subsequently for the correct reproduction of the said movement of the movable lenses during projection. A plurality of curtains moving in front of the projection screen and also synchronized with the movement of the movable set may also be used so as to ensure a proper variable framing of the screen during projection.

The arrangement referred to shows the advantage that it is possible to select for each scene not only the larger screen size or the smaller screen size but also any intermediate size as suitable for the scene considered. This arrangement may of course be associated with any well-known means providing acoustic relief or the like.

Accompanying drawings illustrate diagrammatically by way of example and by no means in a binding sense a preferred embodiment of the present invention. In said drawings:

Figs. 3, 4 and 5 are diagrammatic showings on a slightly larger scale than Fig. 1 showing the anamorphotic lenses in three positions corresponding to three magnification values.

Figs. 6 and 7 show finally in a diagrammatic manner, respectively in cross-sectional and in plan view, the mechanism which allows shifting the two lenses of the intermediate movable set according to a predetermined governing procedure with a view to reaching the desired result.

Figure 1:
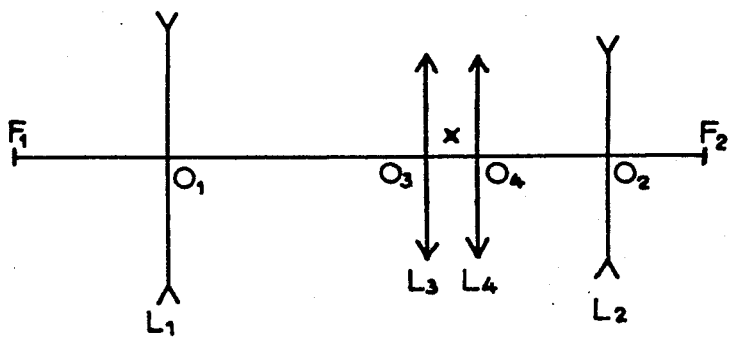
Fig. 1 is a simplified diagrammatic showing of a variable optic anamorphising system according to the invention, to be associated with an objective of a conventional type which is not illustrated.

In Fig. 1, the optic system, intended for association with a view-taking or projecting objective which is not illustrated, is constituted by a system of cylindrical lenses having vertical generating lines, the planes of symmetry being the same for all the lenses. The disclosure will refer hereinafter, for the sake of clarity, only to the phenomena produced in the horizontal plane of symmetry which forms the plane of the figure.

The two extreme lenses $L_1$ and $L_2$, the locations of which do not vary although the location of $L_1$ may be adjusted as described hereinafter, are negative lenses the focal lengths of which are $f_1$, $f_2$. Between the two lenses is mounted a movable set including two positive lenses $L_3$ and $L_4$ having preferably equal focal lengths $f_3$, said positive lenses being adapted to move with reference to each other and with reference to the two stationary lenses. The shifting of the lenses $L_3$ and $L_4$ is adjusted, in a manner to be disclosed hereinafter, so that the picture of the image focus $F_1$ of the first lens $L_1$ with reference to the optic system constituted by the movable set lies exactly in the object plane of the second stationary lens whatever may be the locations of the intermediate lenses of the movable set. Consequently, in all positions and for the optic arrangement considered as a whole, there is obtained an afocal system the magnification provided by which depends on the focal lengths $f_1$ and $f_2$ and also on the magnification ratio defined by the locations of the movable lenses. This is true when the view-taking is performed on very distant parts, whereas in the case of nearer objects it is necessary to provide for a correction of the focusing through action on the adjustable lens $L_1$. As a matter of fact and as well-known in the art, the arrangement of cylindrical lenses produces true images only for the double points of the homographic correspondence established between the object space and the image space, which condition is naturally satisfied for the points of an object at the infinite.

When the object is nearer, the convergence remaining after correction of the afocal system should be such that the image plane still coincides with the object plane.

I may to this end provide a corrective shifting of one of the lenses and in particular of the lens $L_1$, which shifting is independent of that of the movable lenses. Once the focusing has been thus suitably adjusted, it is possible to modify the field of the anamorphosing system through a shifting of the movable set, without this having any action on the adjusted focusing.

Through a suitable selection of the different parts of the system, it is possible by a mere shifting of the lenses of the movable set, in accordance with a governing schedule as disclosed hereinafter, to produce a modification of the magnification or enlargement ratio through movement of said lenses, said magnification ranging at least between 1 and 3. The system as a whole will provide thus a selective variable magnification which has an effect solely in the principal cross-sectional plane of the system extending perpendicularly to the generating lines i.e. in a horizontal plane. Such a system located in front of the objective will produce consequently an anamorphosis in the horizontal direction and it is possible to modify the magnitude of such an anamorphosis through a shifting of the lenses forming the movable set.

The position of the lenses of the movable lens set with reference to the stationary lenses for each enlargement value may be calculated as follows by resorting to the laws of elementary optics: Supposing, in accordance with the usual references applied in optics, that $p_1$ is the abscissa of the focus $F_1$ of the first stationary lens, taking as an origin of the abscissae the optic centre $O_3$ of the first lens $L_3$ of the movable set while $p'_1$ is the abscissa of the image $I_1$ of said focus through the first lens, $L_3$, with the same origin of abscissae, $p_2$ the abscissa of said image $I_1$, taking as an origin of the abscissae the optic centre $O_4$ of the second lens $L_4$ of the movable set and $p'_2$ the abscissa of the image $I_2$ of said image $I_1$ through the second lens of the movable set with the last mentioned origin of abscissae, the image $I_2$ coinciding as mentioned hereinabove with the object focus $F_2$ of the second stationary lens $L_2$ and finally supposing that $x$ defines the distance separating the centre $O_3$ from the centre $O_4$, calculation executed in accordance with the conventional rules formulated by Gauss shows that the following equation is true, $L_1$ designating the unvarying distance $F_1$, $F_2$ while $p_2$ and $p'_2$ are replaced by thier values given as functions of the other data:

(1) $x^2 = (p'_1 + L + p_1)x + p'_1(L + p_1 - f_3) + f_3(L + p_1)$ and this equation associated with the equation (2) $p'_1 = \dfrac{p_1 f_3}{p_1 + f_3}$ allows calculating the value of $x$ i.e. the distance between the two lenses of the movable set as a function of the distance $p_1$ which defines the position of the first of said intermediate lenses with reference to the stationary lenses; obviously the value $x$ is the positive root of the above equation of the second degree.

In practice, it is of course necessary, with a view to obtaining a suitable embodiment, to satisfy, in accordance with the usual rules of optics, other conditions relating to the cutting out of spherical aberration and also of field curvature and of chromatic aberrations. A satisfactory result is achieved by using as an input lens $L_1$ a negative system including either a simple lens or a plurality of suitably shaped lenses cemented to one another. The movable set may on the other hand be constituted by two identical achromatic doublets designed in a manner such that the total modification of the spherical aberrations, during the travel of the lenses which leads to modifications in the magnification, may be reduced to a minimum while the curvature of the field of the whole system may remain negligible; lastly, the last negative lens may be designed in a manner such that the residual aberration, remaining apparent after the last movable lens, may be partly compensated; this latter result may be obtained by selecting as a last negative lens, two elementary lenses cemented together.

Figure 2:
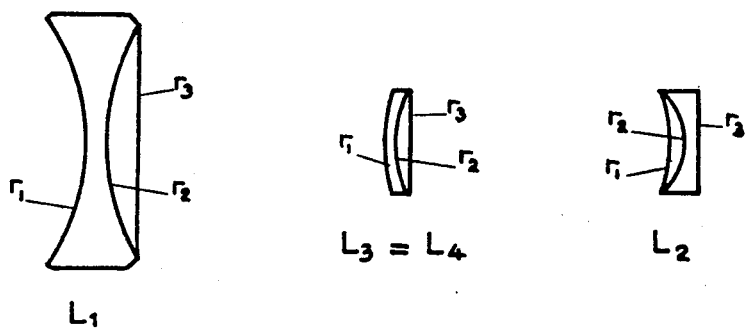
Fig. 2 is a sectional view of the lenses resorted to in this embodiment.

An example of lenses which may be used for such an embodiment has been disclosed in Fig. 2.

Hereinafter are given the specifications of each lens which as apparent includes independent associated glasses. The radii of curvature disclosed for each system of two glasses with references $r_1$, $r_2$, $r_3$, are the radii of curvature of the surfaces considered starting from the left hand side of each compound lens and the refraction indices for each lens are referred to as $n_{1\text{-}2}$ and $n_{2\text{-}3}$, which correspond respectively to glasses bounded by the surfaces having as radii of curvature $r_1$ and $r_2$ and by the surfaces having as radii of curvature $r_2$ and $r_3$ respectively. The following chart is thus obtained

|   |   | Lens thickness, mm. |   |
|---|---|---|---|
| $L_1$ | $R_1 = -80.834$ | 5 | $n_{1\text{-}2} = 1.68968$ |
|   | $R_2 = +81.504$ | 14 | $n_{2\text{-}3} = 1.73110$ |
|   | $R_3 =$ Plane |   |   |
| $L_2$ | $R_1 = -57.812$ | 7 | $n_{1\text{-}2} = 1.60574$ |
|   | $R_2 = -26.000$ | 3 | $n_{2\text{-}3} = 1.71705$ |
|   | $R_3 =$ Plane |   |   |
| $L_3 = L_4$ | $R_1 = +109.775$ | 4 | $n_{1\text{-}2} = 1.69594$ |
|   | $R_2 = +46.338$ | 6 | $n_{2\text{-}3} = 1.65878$ |
|   | $R_3 =$ Plane |   |   |

Figure 3:
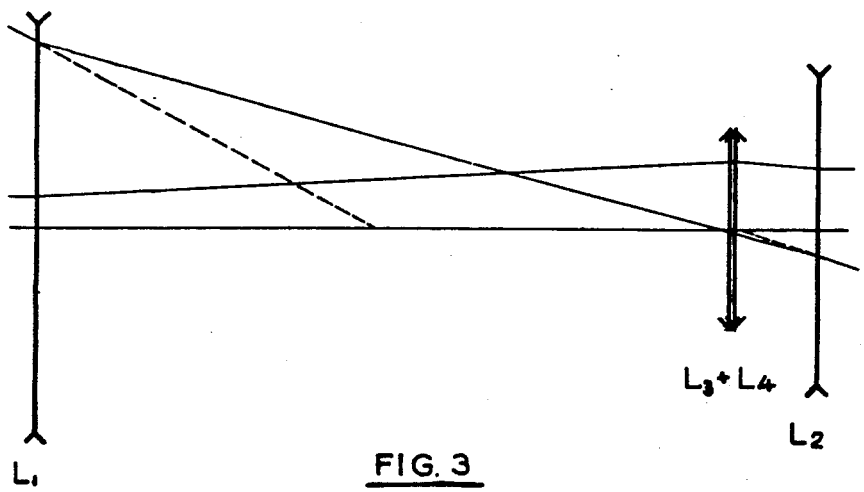

Figs. 3, 4, 5, show the respective positions assumed by the two lenses of the movable set for three arrangements of the anamorphotic system corresponding to three different enlargements:

Fig. 3 corresponds to an enlargement ratio $G = 1/2$

Fig. 4 to an enlargement ratio $$G = \dfrac{1}{1.48}$$

and Fig. 5 to an enlargement ratio $G = 1$

In the case of the first enlargement $G = 1/2$, the two lenses $L_3$ and $L_4$ of the movable set are in contacting relationship and they assume the positions shown for the two other enlargement ratios referred to.

Figs. 6 and 7 illustrate diagrammatically in transverse cross-section and in view from above an arrangement which allows shifting simultaneously the two lenses of the movable set in accordance with a law of displacement corresponding to the Equation 1 given hereinabove, said arrangement providing the desired relationship between the distances $x$ and $p_1$.

To this purpose the mount 1 carrying each of the movable lenses includes at its upper end as shown in Fig. 6 a tenon 2 on which are mounted two superposed roller bearings 3 and 3' for the lense $L_3$, 4 and 4' for the lens $L_4$. The roller bearings 3 and 4 are guided in a rectangular slot 5 formed in a cylinder 6 and said slot is located on a generating line extending at the uppermost part of the cylinder 6 so as to constrain the two lenses to move translationally. The cylinder 6 is stationary.

The other roller bearings 3' and 4' are guided in two slots 7 and 7' formed in the rotary cylinder 8 outwardly coaxial with the cylinder 6; the slot 7 is given for instance a helical shape in a manner such that when the cylinder 8 is caused to rotate round its axis, said slot constrains the lens $L_3$ to move translationally in parallelism with the optic axis at a speed which is proportional to the speed of rotation of the cylinder 8. To each position of the lens $L_3$ defined by the location of slot 7 there should correspond a well-defined position for the lens $L_4$, in accordance with the Equation 1 as obtained by the shape of the corresponding slot 7'. By developing the cylinder 8 over a plane and by drawing the straight line corresponding to the slot 7, it is easy to define point by point and in accordance with the Equation 1 the shape of the developed slot 7' and consequently the shape to be given to last mentioned slot.

Of course, the slot 7 is not necessarily helical and it is also possible to give it any suitable shape, the shape of the slot 7' being obtained starting from this shape of the slot 7 through application of the above mentioned Equation 1.

It will readily be ascertained that, under such conditions, it is sufficient to make the cylinder 8 rotate as desired with a view to modifying the position of the lenses $L_3$ and $L_4$ while maintaining the afocality of the system with a view to modifying the anamorphotic enlargement.

It is thus possible during the view taking to provide the desired modification in the lateral extension of the field of the objective.

Of course, it is necessary for these modifications of the field of the anamorphosing system to be reproduced accurately at the moment of the projection. It is sufficient for this end for the rotary movements of the cylinder 8 to be recorded for instance directly on the film say between the perforations, said record being used with a suitable relay control so as to reproduce the same movements at the moment of the projection.

As already mentioned, it is also necessary at the moment of the projection for the movement of the cylinder 8 to control through suitable relay means the shifting of the curtains adapted to define the operative screen area.

Through the arrangement disclosed, it is thus possible to make the screen correspond in breadth with the requirements of each scene to be projected.

Of course, numerous modifications may be brought to the arrangements disclosed without unduly widening the scope of the invention as defined in accompanying claims.

What I claim is:

1. An anamorphotic afocal optic system for operative association with a kinematographic apparatus including an objective, said system including a first longitudinally adjustable stationary cylindrical lens adapted to be positioned to the front of the objective, a second stationary cylindrical lens, two further cylindrical lenses adapted to move between the two stationary lenses to form therewith the image of the picture to be conveyed through the objective, means for adjusting simultaneously the position of both movable lenses according to the magnification in breadth required at the end of the system remote from the objective, including a carrier for each of the movable lenses, means guiding longitudinally the two carriers in parallelism with the optic axis of the lenses, a movable member having integral therewith means engaging each of said lens carriers to effect longitudinal movement of each of said movable lenses relative to each other and to the stationary lenses to maintain afocality of the lens system and obtain gradual modification of the enlargement of the picture breadth on movement of said movable member.

2. An arrangement for taking views on a kinematographic film and for projecting said film, comprising in combination an apparatus including an objective adapted to cooperate with the film, an anamorphotic afocal optic system including two normally stationary cylindrical lenses having vertical axes the position of which is adjustable with reference to the objective and a movable set of two further cylindrical lenses having vertical axes and adapted to be shifted with reference to one another and with reference to the first-mentioned stationary cylindrical lenses, said movable set maintaining a constant picture height in the vertical direction and producing horizontally, according to the position of said further lenses, a magnification varying with the location of the movable lenses, a carrier for each of the movable lenses, means guiding longitudinally the two carriers in parallelism with the optic axis of the lenses, a rotary sleeve coaxially enclosing the movable lenses and provided with two oblique slots, a member rigid with each lens carrier engaging the corresponding slot in the rotary sleeve, the rotation of the sleeve shifting the movable lenses guided by said slots with reference to each other and to the stationary lenses to provide the desired enlargement of the picture breadth.

3. An anamorphotic afocal optic system for operative association with a kinematographic apparatus including an objective, said system including a first longitudinally adjustable stationary cylindrical lens adapted to be positioned o the front of the objective, a second stationary cylindrical lens, two further cylindrical lenses adapted to move between the two stationary lenses to form therewith the image of the picture to be conveyed through the objective, means for adjusting simultaneously the position of both movable lenses according to the magnification in breadth required at the end of the system remote from the objective, a carrier for each of the movable lenses, means guiding longitudinally the two carriers in parallelism with the optic axis of the lenses, a rotary sleeve coaxially enclosing the movable lenses and provided with two oblique slots, a member rigid with each lens carrier engaging the corresponding slot in the rotary sleeve, the rotation of the sleeve shifting the movable lenses guided by said slots with reference to each other and to the stationary lenses to provide the desired enlargement of the picture breadth.

References Cited in the file of this patent

UNITED STATES PATENTS

| | | |
|---|---|---|
| 1,781,501 | Ford | Nov. 11, 1930 |
| 1,829,633 | Chretien | Oct. 27, 1931 |
| 1,829,634 | Chretien | Oct. 27, 1931 |
| 1,938,808 | Ceccarini | Dec. 12, 1933 |
| 2,000,470 | Miller | May 7, 1935 |
| 2,121,567 | Newcomer | June 21, 1938 |

FOREIGN PATENTS

| | | |
|---|---|---|
| 309,869 | Great Britain | May 3, 1929 |
| 335,864 | Great Britain | Oct. 2, 1930 |
| 612,813 | Germany | May 9, 1935 |

OTHER REFERENCES

"Zoom Lens for Motion Picture Cameras," Back, F.G., pgs. 464–468 of Journal Soc. Motion Picture Engineers, vol. 47, No. 6, Dec. 1946.